Dec. 8, 1970 R. C. McMASTER ET AL 3,546,498

CURVED SONIC TRANSMISSION LINE

Filed June 13, 1969 4 Sheets-Sheet 1

INVENTORS
ROBERT C. McMASTER
CHARLES C. LIBBY
HILDEGARD M. MINCHENKO
BY Anthony D. Cennamo
ATTORNEY Dec. 8, 1970 R. C. McMASTER ET AL 3,546,498

CURVED SONIC TRANSMISSION LINE

Filed June 13, 1969 4 Sheets-Sheet 2

INVENTORS
ROBERT C. McMASTER
CHARLES C. LIBBY
HILDEGARD M. MINCHENKO
BY Anthony D. Cennamo
ATTORNEY INVENTORS
ROBERT C. McMASTER
CHARLES C. LIBBY
HILDEGARD M. MINCHENKO
BY
ATTORNEY

CURVED SONIC TRANSMISSION LINE

Filed June 13, 1969 4 Sheets-Sheet 4

INVENTORS
ROBERT C. Mc MASTER
CHARLES C. LIBBY
HILDEGARD M. MINCHENKO
BY Anthony D. Cennamo
ATTORNEY 3,546,498

CURVED SONIC TRANSMISSION LINE

Robert C. McMaster and Charles C. Libby, Columbus, and Hildegard M. Minchenko, Reynoldsburg, Ohio, assignors to The Ohio State University, Columbus, Ohio, an institution of higher learning Continuation-in-part of application Ser. No. 508,804, Nov. 19, 1965. This application June 13, 1969, Ser. No. 833,072
Int. Cl. H04r 17/00
U.S. Cl. 310—8.2 10 Claims

ABSTRACT OF THE DISCLOSURE

Electromechanical transducers having a high Q and an improved structural arrangement for delivering from a source-over given lengths-extremely high power outputs with a minimum of power loss. Specifically, data is correlated with various embodiments in the transmission of ultrasonic energy through extended nonlinear, i.e., curved or bent, transmission lines of various wavelengths.

CROSS REFERENCES

This application is a continuation-in-part of the copending application, S.N. 508,804, filed Nov. 19, 1965, now continuation application, S.N. 852,980, filed Aug. 19, 1969 for "Sonic Generator," by Robert C. McMaster and Charles C. Libby, and assigned to The Ohio State University.

BACKGROUND

An electromechanical transducer such as a piezoelectric device is capable of transforming high frequency electrical impulses into high frequency mechanical impulses or vice versa. With a continuous alternating-polarity input-voltage imposed on the piezoelectric elements, the transducer generates, transmits and amplifies a series of mechanical compression waves in the piezoelectric material and its metal supporting structure respectively. Considering the transducer alone, a succession of identical compression and tension waves transmitted in a transducer of proper length produces a standing wave pattern.

In a straight bar on the standing wave maxima and minima locations correspond respectively to locations of maximum and minimum velocity, minimum and maximum stress, and maximum and minimum displacement on the transducer body. These locations determine optimum positions for points-of-support, "steps" or changes in diameter, tools or mechanical couplers, etc. The node locations on the transducer correspond to locations of minimum axial displacement and velocity, the antinode locations correspond to locations of maximum axial displacement and velocity or motion. The distance measured on the transducer between adjacent antinodes is equal to one-half wavelength at the fundamental resonance frequency, the length being dependent and variable with the shape.

There is disclosed in United States patents, No. 3,368,-085, for "Sonic Transducer," by Robert C. McMaster and Berndt B. Dettloff, and No. 3,396,285, for "Electromechanical Transducer," by Hildegard M. Minchenko, piezoelectric sonic transducers that combine the driving element with the mechanical displacement amplifier (horn) in a novel way. These transducers are, in essence, a resonant horn structure excited internally close to the vibrational node. The excitation is in contrast to the external excitation common when horns are utilized in a sonic transducer system. The transducer therein disclosed is a high Q transducer, high power, exceptionally rugged, compact, and capable of carrying continuous work loads.

In the copending application, S.N. 508,804, for "Sonic

Generator," filed Nov. 19, 1965, now continuation application, S.N. 852,980, filed Aug. 19, 1969 by Robert C. McMaster and Charles C. Libby, of which this application is a continuation-in-part, there is disclosed a motor-generator not intended for the utilization of the generated force as a work load but directed toward the transfer of high-power energy from one point to another with high efficiency. In that application the motor generator comprises two transducers coupled at the tips of their horns. In relatively short over-all lengths, the two transducers plus the transmission line connecting them must be a multiple of one-half wavelength for maximum energy transfer. In its simplest embodiment a one-half wave resonant transmission line is added between two transducers. This develops a node point of zero longitudinal displacement half way between the transducers.

In another copending application, S.N. 637,306, for "Sonic Transmission Line," filed May 9, 1967, by Charles C. Libby and Karl F. Graff, there is disclosed apparatus for the delivery of high-power sonic energy to a work surface. A high Q, high-power transducer having an extended transmission line couples the transducer to the work area. That is, improvements have been achieved in frequency sensitivity to load changes, i.e., to changes in load coupling at the load interface and in the load characteristic changes; thus improving the ability of the sonic transducer to deliver large amounts of power to a work interface with only a minimum requirement of transducer frequency change. Designs in the transmission line per se maximize the percent of the theoretical capabilities of a high Q transducer to be delivered to a unit surface with a constant frequency power supply, i.e., increased efficacy.

The transmission line in the aforesaid patent application is linear—a straight rod of metal. It had been found that imparting a sharp curvature to the transmission line caused most unusual results in the output power from the transducer and, in most instances, a drastic reduction in power output.

SUMMARY OF INVENTION

The present invention is for a high Q, high-power transducer utilizing extended transmission links that are curved—characterized, however, by only a minimum of power output loss. In the preferred embodiment, for a long transmission line, the bends in the transmission line are located at the antinodes. Data and results are also shown utilizing various curvature transmission lines and lines of various degrees of bend.

OBJECTS

It is accordingly a principal object of the present invention to provide an electromechanical transducer and nonlinear transmission line for the delivery of high power with only a minimum of frequency change in the transducer system.

It is a further object of the present invention to provide a nonlinear transmission line of given lengths that maximizes the power delivery of a high Q transducer with a constant frequency power supply.

It is another object of the present invention to provide a nonlinear transmission line at given lengths with only a minimum of loss of power output.

Other objects and features of the present invention will become apparent from the following detailed description when taken in conjunction with the drawings.

DETAILED DESCRIPTION OF THE DRAWINGS

Figure 1:
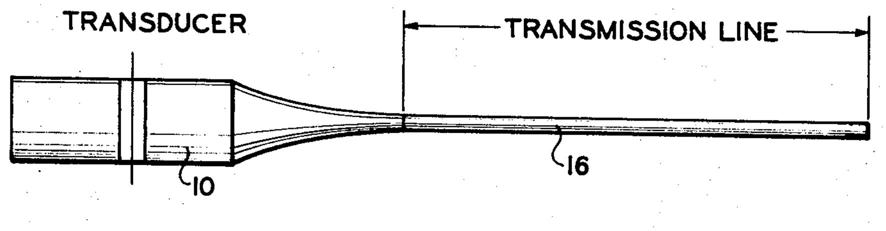
FIG. 1 is a simple schematic illustration of the sonic transducer together with a transmission line.

The general configuration of the transducer-transmission line assembly is shown in FIG. 1. The combined vibrations of the assembly, comprising transducer 10 and transmission line 16, are made by assuring that the vibrations of the transducer and line tend to decouple so that the transducer acts as a forcing source mounted on the end of the line. In practice, this is often realized when the system is operating at or near a natural frequency of the free transmission line.

The transmission lines are solid steel rods of varying length. Since these lines are characterized by a very high $L/d$ ratio, they act acoustically as thin rods.

The analysis of the effect of increasing transmission line length, insofar as the natural frequencies of vibration of the system are concerned, is not related to the power-transmitting capabilities at these frequencies. It is related solely to the natural frequencies which may be expected from a free and unsupported thin rod. Changes in resonant frequency, appearing in transmission lines of various lengths, caused by equal increments of length change, are a measure of resonance sensitivity. The resonance sensitivity is related to the power-delivery capabilities of a sonic power system, due to the special qualities of the constant frequency high Q transducer. The long transmission line is affected less by incremental changes in its length than are the shorter lines.

Figure 2:
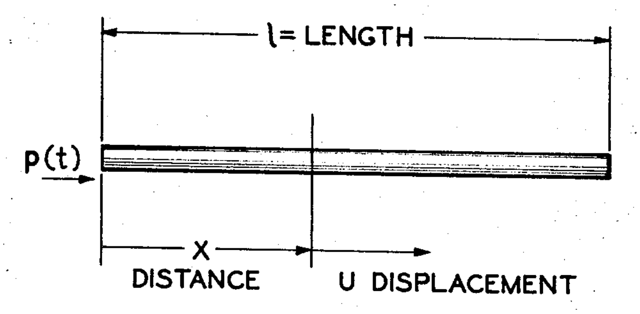
FIG. 2 is a schematic illustration of the sonic transmission line with an applied force.

The analysis of the longitudinal vibration characteristics of a simple rod is shown in FIG. 2 wherein the basic transmission line of length L with an applied force $p(t)$ located at $X=0$.

The equation governing the simple longitudinal vibrations of rods is given in the aforesaid patent application, S.N. 637,306.

Figure 3:
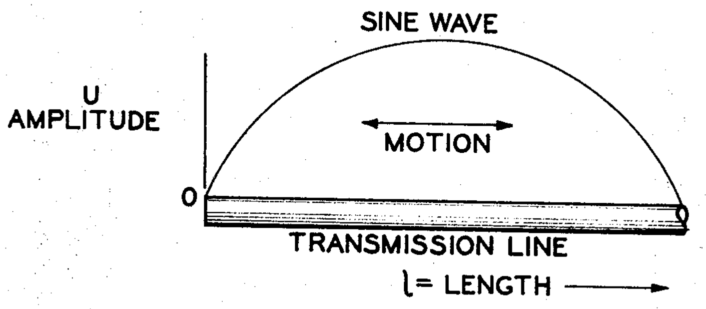
FIG. 3 is another schematic illustration of the transmission line vibrating in the lowest mode.

With reference to FIG. 3 a rod vibrating in its lowest mode is illustrated. The arrow represents the direction of motion—the amplitude is given by $u$, L is the rod length.

The utility of transmission lines, in the form of straight steel rods, for transferring sonic energy from the transducer to a work surface has been set forth in the aforementioned copending applications. However, limits imposed by straight line transmission requirements tended to eliminate numerous potentially useful applications of sonic energy. It has been shown that transmission lines formed into circular arcs are also capable of transmitting sonic power.

There are many differentiations between the curved lines and the straight rod lines. For instance, the resonance characteristics of curved lines are not predictable by conventional techniques. That is, curved lines, equal in curvlinear length to resonant straight lines, have shifted resonant frequencies. In addition, resonant modes having no counter parts in straight lines were observed.

This behavior of the curved lines is attributed to flexural vibrations that are unavoidably initiated by the longitudinal sonic vibrations. The coupled flexural-longitudinal motion is thus no longer accurately described by the simple theory governing the vibrations of straight rods.

The prior art evaluations made it evident that inconsistencies existed between the various versions of the equations, predicting the curved line propagation. Consequently, it became necessary to redevelop the equations from first principles and to establish the accompanying boundary conditions. When shear deformations are neglected, it is in effect said that shearing strain is zero: $e_{r\theta}=0$. It is then established that $$\phi=\frac{1}{R}(u-w') \qquad \text{Eq. (10)}$$

This restriction on $\phi$ constrains the rod cross sections to remain at right angles to the center line, similar to the elementary strength of material development for straight beams. With this restriction on the displacements, it is possible to rederive the governing equations. This is not necessary, however, if some care is employed in modifying the existing more general results.

It is first noted that as a consequence of $e_{r\theta}$, the ring shear stress Q vanishes. Yet the shear stress still appears in the equations of motion. This apparently anomalous fact merely emphasizes that the ring shearing stress is no longer obtainable from elastic deformation considerations, but must be determined from the equations of motion. Thus, to solve for Q, $$Q=\frac{1}{R}M'-\rho\frac{Ak^2}{R}(\ddot{u}+R\ddot{\phi}) \qquad \text{Eq. (11)}$$

From Eq. 10 this becomes $$Q=\frac{1}{R}M'-\rho\frac{Ak^2}{R}(2\ddot{u}-\ddot{w}') \qquad \text{Eq. (12)}$$

Substituting the above and Eq. 10 the simplified equations of motion are obtained, $$\rho RA\left[u\left(1+3\frac{k^2}{R^2}\right)-2\frac{k^2}{R^2}\ddot{w}'\right]=N'+\frac{1}{R}M'$$

$$\rho RA\left[\ddot{w}-\frac{k^2}{R^2}\ddot{w}''+2\frac{k^2}{R^2}\ddot{u}'\right]=-N+\frac{1}{R}M'' \qquad \text{Eq. (13)}$$

The modified expressions for the ring stresses N and M, are $$N=\frac{EA}{R}(u'+w)+\frac{EAk^2}{R^3}(w''+w),\ M=-\frac{EAk^2}{R^2}(w''+w) \qquad \text{Eq. (14)}$$

where E is Young's modulus.

The modified form of the boundary conditions are obtained by replacing $\phi$ by Eq. 10 and regrouping terms to give $$\dot{u}(N+M/R),\ \dot{w}'M,\ \dot{w}Q\Big|_{\theta_1}^{\theta_2}=0 \qquad \text{Eq. (15)}$$

where Q is given by Eq. 13. For example the fixed and free end conditions are now, $$\text{fixed end: } \dot{u},\ \dot{w}',\ \dot{w}=0$$
$$\text{free end: } N+M/R,\ M,\ Q=0 \qquad \text{Eq. (16)}$$

The combination of ring stresses that occurs for the free end is analogous to those occurring in classical plate theory for a free edge (the Kirchloff edge conditions).

The simplified form of the displacement equations of motion are obtained by substituting Eq. 14 into Eq. 13. The results are $$\rho RA\left[\ddot{u}\left(1+3\frac{k^2}{R^2}\right)-2\frac{k^2}{R^2}\ddot{w}'\right]=\frac{EA}{R}(u''+w')$$

$$\rho RA\left[\ddot{w}-\frac{k^2}{R^2}\ddot{w}''+2\frac{k^2}{R^2}\ddot{u}'\right]=-\frac{EA}{R}(u'+w)-\frac{EAk^2}{R^3}(w^{IV}+2w''+w) \quad \text{Eq. (17)}$$

The equations obtained have been a result of neglecting shear deformation, although rotatory inertial effects have been retained. Now, in the study of straight beams, it is found that when both rotatory inertia and shear effects are included in the development, that the rotatory inertial contributes only slightly to the change from the classical Bernoulli-Euler theory of beams and that the shear effect dominates all changes. Hence, in the present development, it is deemed reasonable to neglect rotatory inertia if shear is neglected. This inertia effect is carried by the acceleration terms of Eq. 12. By neglecting the contribution of this term in developing Eq. 16, the following equations result:

$$\rho RA\left[\ddot{u}\left(1+\frac{k^2}{R^2}\right)-\frac{k^2}{R^2}\ddot{w}'\right]=\frac{EA}{R}(u''+w')$$

$$\rho R\ddot{w}=-\frac{EA}{R}(u'+w)-\frac{EAk^2}{R_3}(w^{IV}+2w''+w) \quad \text{Eq. (18)}$$

A final modification is in order if it is noted that in neglecting rotatory inertia, terms remain in Eq. 17 that are of the same order as those omitted, namely $k^2/R^2$. Dropping these remaining terms, we obtain our final version of the simplified displacement equations of motion, $$\rho RA\ddot{u}=\frac{EA}{R}(u''+w') \quad \text{Eq. (19)}$$

$$\rho RA\ddot{w}=-\frac{EA}{R}(u'+w)-\frac{EAk^2}{R^3}(w^{IV}+2w''+w)$$

The first point of interest in considering the results is to note the positions of the curves for $k^2=0$, which is the case of a straight rod. These are the straight lines in the dispersion curve graph of FIG. 5. The horizontal line, given by $c=1$ represents the classical results for longitudinal vibrations in a straight rod, where all wavelengths propagate with constant velocity. The inclined straight line $\bar{c}=\xi$ represents the results for the propagation of flexural waves as governed by Bernoulle-Euler Theory. In a similar fashion there are two lines on the frequency spectrum, FIG. 5, corresponding to the straight rod case; the straight line, $\bar{\omega}=\bar{\xi}$ is the longitudinal mode and the curved line, $\bar{\omega}=\bar{\xi}$ corresponding to the flexural mode.

Figures 5, 6, 7, 7A:
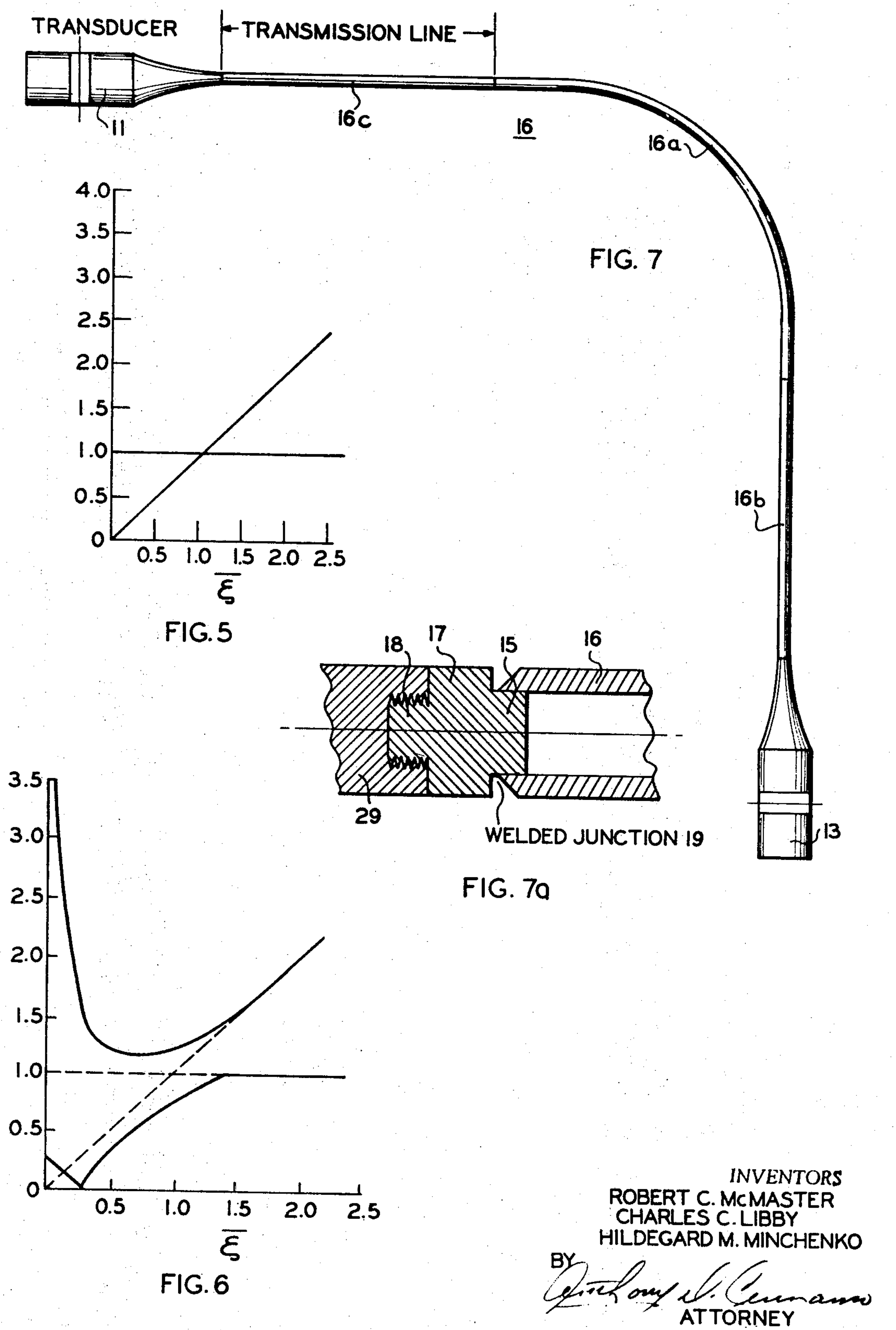
FIG. 5 is a graphical illustration of a dispersion curve.
FIG. 6 is a graphical illustration of another dispersion curve.
FIG. 7 is an illustration of a preferred embodiment of a pair of transducers utilizing a curved transmission line.
FIG. 7*a* is an exploded view of the coupling therebetween.

The remaining curves of graphs plotted in FIG. 6, depict the effects of increasing curvature on the wave propagation, where the behavior may be easily contrasted to the case of a straight rod. It may be generally noted that for each value of curvature, there are two branches of the frequency spectrum of dispersion curves. In contrast to the case of a straight rod, however, where one branch represents purely longitudinal motion and the other purely flexural, each branch for the curved line represents a coupled motion where both longitudinal and flexural motions participate. However, the degree to which a propagation mode is longitudinal or flexural must await further study of the amplitude ratios resulting from the solution.

To establish the regions of the graphs that pertain to their range of sonic vibrations, consider the case of a 1" diameter steel rod. Then $$\xi=\frac{\xi}{4},\ \bar{\omega}=\frac{\pi}{4}\times 10^{-15}f,\ \bar{c}=\frac{c}{20}\times 10^{-4}$$

For a vibrational frequency of $f=10^4$ c.p.s., $\bar{\omega}=0.079$. This is in the low range of the over-all scale of the frequency ordinate of FIG. 6. By obtaining the approximate values of $\xi$ and $\bar{c}$ directly from graphs plotted there may be obtained the various wavelengths and propagation velocities corresponding to 10 kc. vibrational frequency for various curvatures.

Figure 4A:
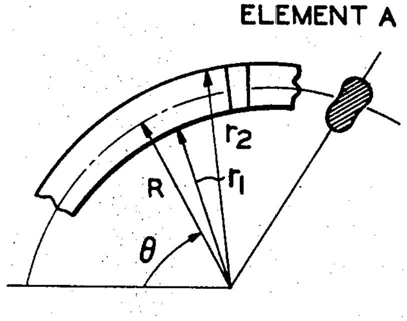
FIG. 4*a* is an arc segment of a circular ring illustrated by a graph.
Figure 4B:
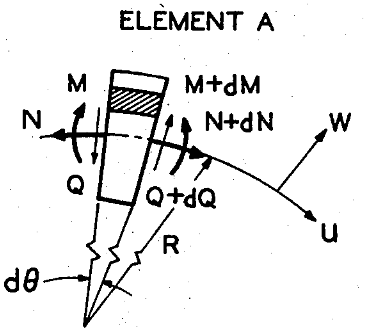
FIG. 4*b* is a graph illustrating a differential arc segment of a ring.

With reference to an arc segment of a circular ring, as shown in FIG. 4*a*, where R is the centroidal radius of the ring, $r_1$, $r_2$ are the inner and outer radii and 0 is the polar angle to an arbitrary location on the ring. A differential arc segment of the ring is shown in FIG. 4*b*. Also shown is the resultant normal force N, shear force Q and bending moment M acting at a cross section of the ring, as well as differential variations of these quantities $N=dN$, $Q+dQ$, $M+dm$. The displacement components of the centerline are also shown as $u$ and $w$ where the former measures tangential displacement, the latter radial. All quantities are shown in their positive sense.

Figure 4C:
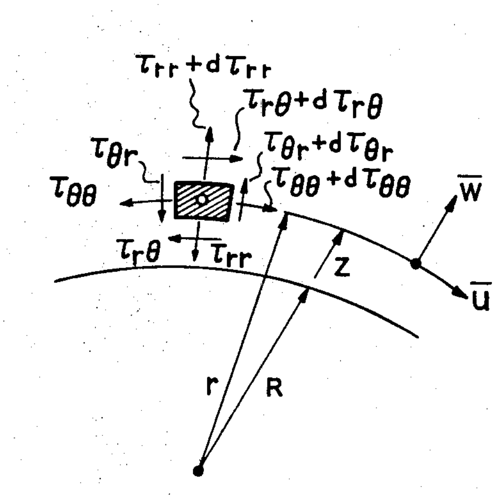
FIG. 4*c* is a graph illustrating a differential element of a ring in polar coordinates.

Also shown in FIG. 4*b* is a shaded differential subelement. The coordinates defining the position of this element and the stresses acting on it are shown in FIG. 4*c*. Thus, $r$ is the radial coordinate of the element with respect to the center of curvature of the ring (also the coordinate origin) while $z$ is the location with respect to the centerline and $r=R+z$. The normal and shear stresses acting on the element are shown as well as differential variations in these quantities. Tangential and radial displacement components of the element are measured by $u$ and $w$.

The effects of shear deformation and rotational inertia on the propagation characteristics of curved lines were neglected in obtaining the numerical results of the propagation characteristics. It is necessary in curved rings, however, to include the higher order effects of shear deformation and rotational inertial in order to assess the accuracy of the simpler propagation theories.

As shown in FIG. 4*a*, a ring cross section of area A and angular location $\theta$ is subjected to the normal force N, shearing force Q, and bending moment M. The centerline radius of the ring is R. The displacement and rotation components of the cross section are shown in FIG. 4*b*, where $u$ and $w$ are the tangential and radial components, respectively, of the cross section displacements measured at the centerline. The rotation of the cross section is measured by $\phi$.

For the given ring section, of coordinates and displacement components as shown, and acted upon by the indicated forces and moments, the governing equations of motion are shown to be $$\rho RA\left(\ddot{u}+\frac{k^2}{R}\ddot{\phi}\right)=N'+Q$$

$$\rho Ak^2(\ddot{u}+\ddot{\phi})=M'-RQ$$

$$\rho RA\ddot{w}=Q'-N \quad \text{Eq. (20)}$$

where $k^2$ is the cross section radius of gyration and $\rho$ is the material density. In the above, partial derivatives with respect to time are indicated by the dot notation (e.g., $\ddot{u}=\partial^2u/\partial t^2$) while the prime notation indicates partial differentiation with respect to $\theta$ (e.g., $N'-\partial N/\partial\theta$).

The internal forces and moments N, Q and M are related to the ring displacements and rotations $u$, $w$ and $\phi$ by the following:

$$N=\frac{EA}{R}(u'+w)+\frac{EAk^2}{R^3}(u'+w-\phi')$$

$$Q=\frac{G'A}{R}(1+k^2/R^2)(w'-u+R\phi)$$

$$M=-\frac{EAk^2}{R^2}(u'+w-R\phi') \quad \text{Eq. (21)}$$

E is Young's Modulus while G′ is a modified shear modulus, defined by $$G' = \bar{G}k \qquad \text{Eq. (22)}$$

where $\bar{G}$ is the usual shear modulus and $k$ is a shear coefficient which will be taken as equal to the Timoshenko shear coefficient for a straight beam of identical cross section.

The displacement equations of motion are bound by substituting Eq. 21 and Eq. 20, giving, $$\rho RA\left(\ddot{u}+\frac{k^2}{R}\ddot{\phi}\right)=\frac{EA}{R}(u''+w')+\frac{EAk^2}{R^2}(u''+w'-R\phi'')+\frac{G'A}{R}(1+k^2/R^2)(w'-u-R\phi)$$

$$\rho Ak^2(\ddot{u}+R\ddot{\phi})=-\frac{EAk^2}{R^2}(u''+w'-R\phi'')-G'A(1+k^2/R2)$$

$$w'-u+R\phi)$$

$$\rho RA\ddot{w}=\frac{G'A}{R}(1+k^2/R^2)(w''-u'+R\phi)-\frac{EA}{R}(u'+w)-\frac{EAk^2}{R^3}(u'+w-R\phi') \qquad \text{Eq. (23)}$$

Contained in the equations set forth in Eq. 23 are the effects of shear deformation and rotational inertia. The former effect is carried by the G′ terms of Eq. 23, while the latter effect is contributed by the left-hand side of Eq. 22. In addition, a type of Winkler-Bach effect (designated the "W-B effect" in the sequel), associated with the shift in neutral axis location due to ring curvature is indicated by the presence of the $(u'+w-Ro')$ term of Eq. 21.

A systematic assessment of the shear, rotational inertial and W-B effects on the propagation characteristics of curved lines can be carried out by deleting the terms of interest from the governing Equations 23. This gives the desired results for rotational inertia and W-B effects. However, the effect of neglecting shear deformation cannot be determined by such a simple deletion due to the fact that, although shearing deformations may be considered to vanish, shearing forces will still be nonzero.

The procedure for considering shear deformations to vanish, then, is to redevelop the basic governing equations after incorporating appropriate kinematical assumptions. Thus, no shear deformation implies the kinematical condition of $$\phi=(u-w')/R \qquad \text{Eq. (24)}$$

When this is substituted in the expressions for N and M, the result is $$N=\frac{EA}{R}(u'+w)+\frac{EAk^2}{R^3})w''+w)$$

$$M=-\frac{EAk^2}{R^2}(w''+w) \qquad \text{Eq. (25)}$$

The Winkler-Bach shift effect is still retained in the above. However, it is seen from Eq. 21 that $Q=0$ results from Eq. 24. The interpretation of this is that Q may no longer be determined from elastic considerations, but must be determined from the equations of motion. The remaining steps are to solve Eq. 20 for Q and substitute it, along with the kinematic condition of Eq. 24, into the remaining two equations of motion. The resulting two equations are $$\rho RA\left[\ddot{u}(1+2k^2/R^2)-2\frac{k^2}{R^2}\ddot{w}'\right]=N'+M'/R$$

$$\rho RA\left[\ddot{w}-\frac{k_2}{R_2}\ddot{w}''+2\frac{k^2}{R^2}\ddot{u}'\right]=-N+M''/R \qquad \text{Eq. (26)}$$

Although the results contain no shear deformation effects, rotational inertia and W-B contributions are still present. The displacement equations of motion are obtained by substituting Eq. 25 in Eq. 26, giving $$\rho RA\left[\ddot{u}(1+3k^2/R^2)-2\frac{k^2}{R^2}\ddot{w}'\right]=\frac{EA}{R}(u''+w')$$

$$\rho RA\left[\ddot{w}-\frac{k^2}{R^2}\ddot{w}''+2\frac{k^2}{R^2}\ddot{u}'\right]=-\frac{EA}{R}(u'+w)-\frac{EAk^2}{R^3}(w^{IV}+2w''+w) \qquad \text{Eq. (27)}$$

The propagation of waves in a ring is governed by dispersion relations which may be developed by considering solutions of Eq. 2 of the form $$u=A_1e^{i(\xi R\theta-\omega t)},\ w=A_2e^{i(\xi R\theta-\omega t)}$$

$$\phi=A_3e^{i(\xi R\theta-\omega t)}$$

where $A_1$, $A_2$, $A_3$ are frequency dependent wave amplitudes and $\xi$ is the wave number. Substitution of Eq. 28 in Eq. 23 yields three homogeneous equations in the constants $A_1$, $A_2$, $A_3$. The amplitudes are made nondimensional by defining, $$\bar{A}_1=A_1/k,\ \bar{A}_2=A_2/k,\ \bar{A}_3=A_3 \qquad \text{Eq. (29)}$$

In this way, dimensionless constants will appear in the resulting three equations, which are $$\begin{bmatrix} a_{11} & a_{12} & a_{13} \\ a_{21} & a_{22} & a_{23} \\ a_{31} & a_{32} & a_{33} \end{bmatrix}\begin{bmatrix} \bar{A}_1 \\ \bar{A}_2 \\ \bar{A}_3 \end{bmatrix}=0 \qquad \text{Eq. (30)}$$

In presenting the defining expressions for the $a_{ij}$ of Eq. 30 the contributions of shear effect, rotational inertia and the W-B shift effect may be done by utilizing the symbols * and + above certain contributing terms, where

*=rotational inertia contribution
+=W-B shift effect

The shearing force contribution will always be identified by the G coefficient terms. Then, $$a_{11}=-[\bar{\xi}^2+K^{+}\bar{\xi}^2+GK^2(1+K^2)-\bar{\xi}^2\bar{c}^2]$$

$$a_{12}=iK\bar{\xi}[1+\overset{+}{K^2}+G(1+K^2)]$$

$$a_{13}=K[\overset{+}{\bar{\xi}^2}+G(1+K^2)-\bar{\xi}^2\bar{c}^2]$$

$$a_{21}=-L[\bar{\xi}^2+G(1+K^2)+\bar{\xi}^{2*}\bar{c}^2]$$

$$a_{22}=i\bar{\xi}[K^2+G(1+K^2)]$$

$$a_{23}=[\bar{\xi}^2+G(1+K^2)=\bar{\xi}^{2*}\bar{c}^2]$$

$$a_{31}=iK\bar{\xi}[1+\overset{+}{K^2}+G(1+K^2)]$$

$$a_{32}=[K^2+K^4+G(1+K^2)\bar{\xi}^2-\bar{\xi}^2\bar{c}^2]$$

$$a_{33}=-i\bar{\xi}[K^2+G(1+K^2)] \qquad \text{Eq. (31)}$$

where $$\bar{\xi}=\xi k,\ K=k/R,\ G=G'/E,\ \bar{c}^2=c^2\rho/E \qquad \text{Eq. (32)}$$

The dispersion relations (i.e., the relationship of $\bar{c}^2$ to $\bar{\xi}$) for the curved ring are determined by requiring the vanishing of the coefficient determinant of Eq. 30 given by $$|a_{ij}|=0 \qquad \text{Eq. (33)}$$

The relationship of propagation frequency to wave number (i.e., the frequency spectrum) is found from the dispersion relation results by utilizing the relationship $$\bar{\omega}=\bar{\xi}\bar{c},\ \bar{\omega}=\omega k/(E/\rho)^{1/2} \qquad \text{Eq. (34)}$$

In order to consider wave propagation in the absence of shear effects, but with rotational inertia and W-B effects, Eq. 27 is utilized. Thus, let $$u=B_1e^{i(\xi R\theta-\omega t)},\ w=B_2e^{i(\xi R\theta-\omega t)} \quad \text{Eq. (35)}$$

Substituting Eq. 35 in Eq. 27 yields two homogeneous equations in $B_1$, $B_2$, given as $$\begin{bmatrix} b_{11} & b_{12} \\ b_{21} & b_{22} \end{bmatrix} \begin{bmatrix} B_1 \\ B_2 \end{bmatrix}=0 \quad \text{Eq. (36)}$$

The $b_{ij}$ are defined below. Because the rotational inertia and W-B contributions are more subtly intertwined than in the previous analysis, no identification procedure is attempted.

$$b_{11}=[1-(1+3K^2)\bar{c}^2]\bar{\xi}^2$$
$$b_{12}=-iK\bar{\xi}(1-2\bar{\xi}^2\bar{c}^2)$$
$$b_{21}=iK\bar{\xi}(1-2\bar{\xi}^2\bar{c}^2)$$
$$b_{22}=(1+K^2)K^2-2K^2\bar{\xi}^2+\bar{\xi}^4-\bar{\xi}^2\bar{c}^2(1+\bar{\xi}^2) \quad \text{Eq. (37)}$$

The dispersion relations are found by the usual condition that the coefficient determinant must vanish. Thus, $$|b_{ij}|=0 \quad \text{Eq. (38)}$$

The changes in the coefficients $b_{ij}$ caused by neglecting rotational inertia and W-B effects may best be summarized as below

| $b_{ij}$ | No rotational inertia | No W-B |
|---|---|---|
| $b_{11}$ | $3K^2\rightarrow K^2$ | No change. |
| $b_{12}$ | $2\bar{\xi}^2\bar{c}^2\rightarrow\bar{\xi}^2\bar{c}^2$ | Add $\bar{\xi}^2-K^2$ inside (. . .). |
| $b_{21}$ | $2\bar{\xi}^2\bar{c}^2\rightarrow 0$ | No change. |
| $b_{22}$ | $\bar{\xi}^4\bar{c}^2\rightarrow 0$ | Add $K^2-\bar{\xi}^2$. |

Primarily, the determination of the dispersion relations can only be done numerically with the aid of a digital computer. However, certain special cases and limits may be determined analytically. The cases of general interest are the high frequency limits ($\xi\rightarrow\infty$) and the values of $c$ as $\xi\rightarrow 0$.

Let $\xi\rightarrow\infty$ in Eq. 30. The limiting values of $\bar{c}$ may be determined by factoring out $\bar{\xi}^2$ from the three equations of Eq. 30 and letting the resulting terms of G ($\bar{\xi}^2$) become zero. Upon expanding the determinant of remaining terms, one obtains, $$[(1+K^2)-\bar{c}^2][(1-K^2)\bar{c}^4-(3K^2+2)\bar{c}^2+1]=0 \quad \text{Eq. (39)}$$

Thus, the asymptotic values of $\bar{c}$ are determined by the roots of Eq. 39, given by $$\bar{c}^2=\tfrac{1}{2}[-(3K^2+2)\pm(9K^4+16K^2)^{1/2}]/(1-K^2)\bar{c}^2=(1+K^2) \quad \text{Eq. (40)}$$

The cutoff frequencies, where various modes cease to propagate as the frequency is decreased, are determined by the values of $\bar{\omega}$ as $\bar{\xi}\rightarrow 0$. These may be found by letting $\bar{\omega}=\bar{\xi}\bar{c}$ in the $a_{ij}$ of Eq. 31 and letting $\bar{\xi}\rightarrow 0$. The resulting equation is, $$\bar{\omega}^2[\bar{\omega}^2-K^2(1+K^2)][\bar{\omega}^2(1-K^2)-G(1+K^2)(1+3K^2)]=0 \quad \text{Eq. (41)}$$

which yields cutoff frequencies given by $$\bar{\omega}^2=0,\ K^2(1+K^2),\ \frac{G(1+K^2)(1+3K^2)}{1-K^2} \quad \text{Eq. (42)}$$

In the low frequency limit, consider the limit of Eq. 30 as $\bar{\xi}\rightarrow 0$. However, since the desired quantity, $\bar{c}$, is everywhere multiplied by $\bar{\xi}$, as cursory inspection of the coefficients $a_{ij}$ of Eq. 31 suggests that the desired limit could not be found. A limit, in fact, does exist due, basically, to the fact that $\bar{\xi}^2$ can be factored from the expanded determinant. When such a factorization is carried out, the resulting expanded determinant takes the form, $$\bar{\xi}^2[M_1\bar{\xi}^4\bar{c}^6+M_2\bar{\xi}^2\bar{c}^4+M_3\bar{c}^2+M_4]=0 \quad \text{Eq. (43)}$$

where the coefficients $M_1$, $M_2$, $M_3$, $M_4$ contain powers of $\bar{\xi}$. As $\bar{\xi}\rightarrow 0$, the first two terms in the bracket disappear because of $\bar{\xi}^4$, $\bar{\xi}^2$ terms multiplying $\bar{c}^4$. There remains, $$\bar{\xi}^2[M_3\bar{c}^2+M_4]=0 \quad \text{Eq. (44)}$$

As $\bar{\xi}\rightarrow 0$, this equation will also be satisfied by the disappearance of the bracket. The resulting value of $\bar{c}^2$, $$\bar{c}^2=-M_4/M_3 \quad \text{Eq. (45)}$$

establishes the desired low frequency limit. The results are $$\bar{c}=K(1+K^2)^{-1/2}(1+3K^2)^{-1/2} \quad \text{Eq. (46)}$$

The computer results agree quite quite well with the above predicted values as $\bar{\xi}\rightarrow 0$.

A systematic assessment of shear, rotational inertia and W-B effects on the wave propagation characteristics of lines of various curvatures will result in several possible "effect" combinations. Thus, if we denote by S the shear effect, RI the rotational inertia effect and W-B the Winkler-Bach effect, the combinations could be identified as below, where a -- indicates the absence of an effect:

| | | | | |
|---|---|---|---|---|
| Combination | #1 | S | RI | WB |
| Combination | #2 | S | -- | WB |
| Combination | #3 | S | RI | -- |
| Combination | #4 | S | -- | -- |
| Combination | #5 | -- | RI | WB |
| Combination | #6 | -- | -- | WB |
| Combination | #7 | -- | RI | -- |
| Combination | #8 | -- | -- | -- |

The boundary conditions for the ring appropriate to the theory developed have been shown to be $$\dot{u}\left(N+\frac{M}{R}\right),\ \dot{w}^{M'},\dot{w}'^{M=0,(\theta=\theta_1,\theta_2)} \quad \text{Eq. (47)}$$

A total of eight different boundary conditions are possible, representing various combinations of one each of the three pairs of quantities in Eq. 47. Only the conditions representing clamped, pinned and free end conditions are of general physical interest.

(1) Clamped $$\dot{u}=\dot{w}'=\dot{w}=0$$

(2) Pinned $$\dot{u}=M=\dot{w}=0$$

(3) Free end $$N+M/R=M=M'=0 \quad \text{Eq. (48)}$$

The eigenvalue problem which determines the natural frequencies of the ring is formulated in the following Where the ring is undergoing harmonic vibrations with consideration of U and W and substituting, there is yielded two homogeneous equations for A and B given by $$\begin{bmatrix} (s^2+\lambda^4) & s \\ s & (s^4+2s^2+1)K^2+(1-\lambda^4) \end{bmatrix}\begin{bmatrix} A \\ B \end{bmatrix}=0 \quad \text{Eq. 49}$$

In order to insure the nonvanishing of A and B, the coefficient determinant of Eq. 49 must vanish. This yields the characteristic equation, $$s^6+(2+\lambda^4)s^4+[1+\lambda^4(2-K^{-2})]s^2+\lambda^4[1+(1-\lambda^4)K^{-2}]=0 \quad \text{Eq. (50)}$$

The roots of this equation may be real, imaginary, complex or some combination of these types. Ignoring, for the moment, the nature of the roots, we realize there will be a total of six roots, $s=s_1, s_2 \ldots, s_6$. Then U and W will be of the form $$U=A_1e^{s_1\theta}+\ldots A_6e^{s_6\theta},\ W=B_1e^{s_1\theta}+\ldots+B_6e^{s_6\theta}$$

For any root, $s=s_i$, the constants $A_j$ and $B_i$ will be related by Eq. 49. Thus, solving for $A_i/B_i$ we obtain $$\frac{A_i}{B_i}=\frac{-s_i}{s_i^2+\lambda^4}=-[s_i^4+2s_i^2=1=(1-\lambda^4)K^2/s_i, \quad (i=1, \ldots 6) \quad \text{Eq. (52)}$$

Thus, from Eq. 51 it is seen there are twelve undetermined coefficients, $A_1, \ldots, A_6, B_1, \ldots, B_6$. These are not independent, however, but are related by the six Equations 52. The remaining six equations necessary to determine the constants will come from the boundary conditions. Thus, at either end of the rod, the mathematical boundary conditions, such as clamped, pined or free, appropriate to the physical problem at hand must be applied. These conditions will provide three equations for each end, or a total of six. These six, in conjunction with the previously cited equations of Eq. 52 will provide the necessary twelve equations for the constants.

Figure 4D:
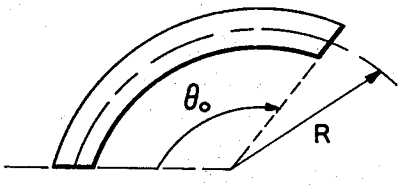
FIG. 4*d* is schematic illustration of a segment of a ring with free-free end conditions.

The procedures for determining the natural frequencies of a ring, described and partially developed in the previous section, will now be applied to the case of a free-free ring. Such a ring is shown in FIG. 4*d*. The situation of the free-free ring would correspond closely to the case of a transmission line unloaded at one end and subjected to sonic vibrations at the other end—at least insofar as natural frequencies are concerned.

The nature of the roots of the characteristic Equation 50 is, in fact, a cubic equation in $s^2$, so that the roots will be of the form, $$s^2=s_1^2, s_2^2, s_3^2 \quad \text{Eq. (53)}$$

On the basis of the preceding, it may be further established that $$s^2=d^2, -e^2, -f^2 \quad \text{Eq. (54)}$$

would be the roots, where $d^2, e^2, f^2>o$. Then, we have that the six roots of the characteristic Eq. 50 will be $$s=\pm d, \pm ie, \pm if \quad \text{Eq. (55)}$$

The U and W, given by Eq. 49 become without presenting the manipulations $$U=A_1 \cosh d\theta+A_2 \sinh d\theta+A_3 \cos e\theta+A_4 \sin e\theta +A_5 \cos f\theta+A_6 \sin f\theta$$

$$W=-\frac{(d^2+\lambda^4)}{d}(A_1 \sinh d\theta+A_2 \cosh d\theta) +\frac{(e^2-\lambda^4)}{e}(A_3 \sin e\theta-A_4 \cos e\theta) +\frac{(f^2-\lambda^4)}{f}(A_5 \sin f\theta-A_6 \cos f\theta) \quad \text{Eq. (56)}$$

These results must now be substituted into the appropriate boundary condition equations. We have selected the case of the free end, so from Eq. 48, condition (3), and expressed in terms of the displacements U and W, and their derivatives, this becomes $$U'+W=0, W'+W=0, W'''+W'=0, (\theta+0, \theta_o) \quad \text{Eq. (57)}$$

The solutions of Eq. 56 must now be substituted in Eq. 57 and evaluated at $\theta=0, \theta_o$. This yields six homogeneous equations in the constants $A_1, \ldots A_6$. Defining the terms $$\alpha_d=(d^2+\lambda^4)/d, \alpha_e=(e^2-\lambda^4)/e, \alpha_f=(f^2-\lambda^4)/f \quad \text{Eq. (58)}$$

The six equations are given as follows:

$$\begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix} \begin{bmatrix} A_1 \\ A_2 \\ A_3 \\ A_4 \\ A_5 \\ A_6 \end{bmatrix}$$

where the $a_{ij}$ coefficients are defined by $a_{11}=0, a_{12}=d-\alpha_d, a_{13}=0, a_{14}=e-\alpha_e,$
$a_{15}=0, a_{16}=f-\alpha_f, a_{21}=0,$
$a_{22}=-(d^2+1)\alpha_d, a_{23}=0, a_{24}=(e^2-1)\alpha_e,$
$a_{25}=0, a_{26}=(f^2-1)\alpha_f, a_{31}=-d(d^2+1)\alpha_d,$
$a_{32}=0, a_{33}=-e(e^2-1)\alpha_e, a_{34}=0,$
$a_{35}=-f(f^2-1)\alpha_f, a_{36}=0, a_{41}=(d-\alpha_d) \sinh d\theta_o,$
$a_{42}=(d-\alpha_d) \cosh d\theta_o, a_{43}=-(e-\alpha_e) \sin e\theta_o,$
$a_{44}=(e-\alpha_e) \cos e\theta_o, a_{45}=-(f-\alpha_f) \sin f\theta_o,$
$a_{46}=(f-\alpha_f) \cos f\theta_o, a_{51}=-(d^2+1)\alpha_d \sinh d\theta_o,$
$a_{52}=-(d^2+1)\alpha_d \cosh d\theta_o, a_{53}=-(e^2-1)\alpha_e \sin e\theta_o,$
$a_{54}=(e^2-1)\alpha_e \cos e\theta_o, a_{55}=-(f^2-1)\alpha_f \sin f\theta_o,$
$a_{56}=(f^2-1)\alpha_f \cos f\theta_o, a_{61}=-d(d^2+1)\alpha_d \cosh d\theta_o,$
$a_{62}=-d(d^2+1)\alpha_d \sinh d\theta_o, a_{63}=-e(e^2-1)\alpha_e \cos e\theta_o,$
$a_{64}=-e(e^2-1)\alpha_e \sin e\theta_o, a_{65}=-f(f^2-1)\alpha_f \cos f\theta_o,$
$a_{66}=-f(f^2-1)\alpha_f \sin f\theta_o$ The computational procedure for solving this system of equations would be as follows:

(1) Select the physical characteristics of the ring, i.e., select R, $K^2$ and $\theta_o$.

(2) For a given value of $\lambda^4$, compute the roots $d^2$, $e^2$, $f^2$ of the cubic.

(3) For these values of $d$, $e$, $f$ and $\lambda^4$, compute the coefficients $a_{ij}$, defined by Eq. 60.

(4) With these values of $a_{ij}$, compute the coefficient determinant of Eq. 59, defined by $$D=|a_{ij}| \quad \text{Eq. (61)}$$

(5) The roots, or eigenvalues, will be those values of $\lambda^4$ such that $D=0$.

(6) For a given root, $\lambda^4=\lambda^4_i$, the corresponding natural frequency is determined from the defining expression for $\lambda^4$, giving $$i=(\lambda^4_i/a^2)^{1/2} \quad \text{Eq. (62)}$$

The sonic energy transfer set of the present invention is shown schematically in FIG. 7. The set constitutes acoustically matched electromechanical transducers 11 and 13 attached on either end of a transmission line 16. The motor generator set constitutes a special case in which a resonant system consisting of the two identical transducers and the transmission line may be loaded with an electrical load (on the generator) without disturbing the acoustic system. This contrasts with unloaded lines, and lines with various unmatched loads and also contrasts to the usual method of useful loading in which the acoustic characteristics of the load are completely different from the driving transducer.

Figure 8:
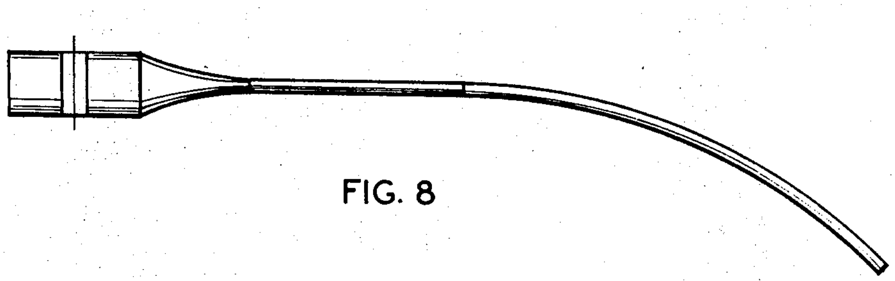
FIG. 8 is an illustration of a single transducer with a different radius curved transmission line having a free-free end.

As pointed out hereinafter the curved transmission line finds utility in other arrangements with a sonic transducer and accordingly the invention is not to "be limited to the motor generator set shown in FIG. 7." It may be appreciated however that the motor generator set as shown is the only available means of actually measuring the efficiencies of the transducer line. More specifically, the curved transmission line may comprise the transducer with a free-free end transmission of that shown schematically in FIG. 4*c*, and specifically such as that shown in FIG. 8. The utilitarian function of the curved transmission line will find application with the configuration of FIG. 8.

In the preferred embodiment shown in FIG. 7 the transmission line 16 basically comprises a pair of straight portions **16*b* and 16*c* joined to the transducers 11 and 13 and the curved portion 16*a* intermediate the two straight portions 16*b* and 16*a*. In this particular arrangement the transmission line 16 is a rod, i.e., circular in cross section and solid. The line 16** is mechanically coupled to the two transducers in a manner sufficient for the transformation of energy. One successful coupling is shown in FIG. 7*a*, an exploded view. The threaded stud 18 of plug 17 is fitted in threaded engagement with the transducer tip 29 whereas the other end 15 is welded at junction 19 to the line 16 with the extended portion fitted on the inside thereof.

Referring generally to FIGS. 8 through 12 it can be seen that various forms of curved transmission lines were investigated. Certain of these lines yielded results superior to others. In order to determine the optimum line, it was necessary to determine the length and radius of curves in solid lines; position of bends with regard to nodal and antinodal points; and amount of angular displacement at antinodal points.

The physical set-up for testing these transmission lines is that of FIG. 7 as described in the aforementioned co-pending application, Ser. No. 508,804, filed Nov. 19, 1965, now continuation application, Ser. No. 852,980, filed Aug. 19, 1969, for "Sonic Generator" by Robert C. McMaster and Charles C. Libby, and assigned to The Ohio State University. The transducer 11 on one end is generating vibratory energy which is transmitted through the transmission line 16 to the second transducer 13. The second transducer 13, in turn, reconverts the vibratory energy into electrical energy. At the output of the second transducer the electrical energy is dissipated in a lamp-load, connected to the second transducer. By measuring watts in the input and output side is the means for measuring incoming and outgoing power, from which over-all efficiencies can be determined. Taking into consideration the transducer losses, which totally add up to approximately 5 percent when resonant operation occurs, the transmission line losses can be determined.

The following table gives a comparison of power loss due to increased length of the curved line:

| Length | Watts in (motor) | Watts out (gen.) | Watts loss | Percent loss |
|---|---|---|---|---|
| 20.24″ | 2,460 | 1,348 | 1,112 | 45 |
| 30.36″ | 2,620 | 1,888 | 740 | 28.8 |
| 40.48″ | 2,400 | 975 | 1,425 | 59.5 |
| 50.60″ | 2,130 | 1,190 | 1,190 | 44 |

Each of the lines had a bending radius sufficient to form a quarter circle, increasing radius of course increased the length of the line. The following table is for similar lengths of lines but in contrast the power loss on straight line transmission:

| | | | | |
|---|---|---|---|---|
| 20.24″ | 3,600 | 2,518 | 1,082 | 30% |
| 30.36″ | 2,640 | 1,740 | 800 | 34% |
| 40.48″ | 3,600 | 2,150 | 1,150 | 35% |
| 50.60″ | 2,620 | 1,870 | 750 | 28.6% |

From the above findings (including transducer losses), there did not seem to be any signifiaant relationship of power loss to length within limits shown except for the 30.36 inch line (3 half-wave lengths). This line showed minimum losses of maximum power transmission. However, since slight frequency changes were noticed during the above measurements, some of the increased losses in the other lines may be attributed to the transducers not operating on exact resonance.

In summary it may be stated that the relationship between the rate of curvature of the line (90° for example) and the line length has been established. Significantly increasing the radius—decreasing the rate of curvature—occurred simultaneously with increasing the line length. Accordingly, the losses may be attributed to rate of curvature and not necessarily to the length of the line. Sharp curvature, i.e., short lines with a curve of 90°, did not transmit energy well, but that with increased line length, i.e., long lines with a curve of 90°, did yield good transmission.

Figure 9:
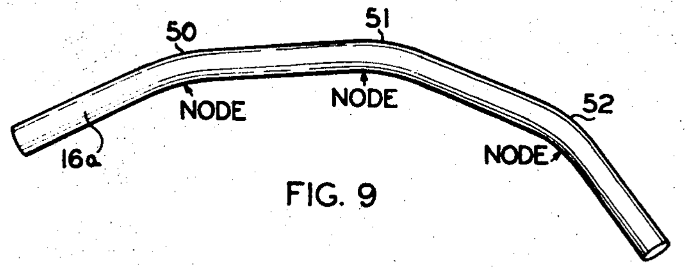
FIG. 9 is another illustration of a curved transmission line with the bends at the nodes.
Figure 10:
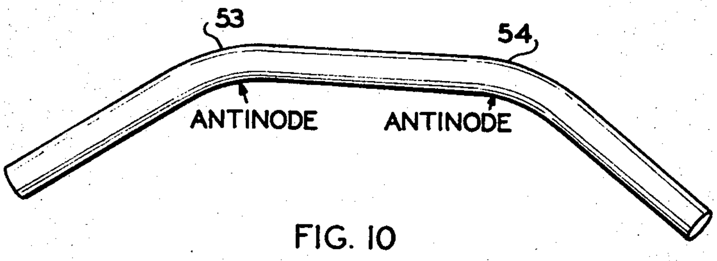
FIG. 10 is another illustration of a curved transmission line with the bends at the antinodes.

During the next investigation the shorter radius had been chosen to determine the relationship in placing the bends with respect to node and antinode. FIGS. 9 and 10 show the two transmission lines which were used. FIG. 9 had the bends at the node whereas in FIG. 10 the bends are at the antinodes. It has been found that power losses varied considerably between nodal and antinodal bending. The transmission line with three equal bends equaling 90 degrees at the antinodes had approximately 28% power loss, while the same line bent at the anodes had approximately 46% power loss.

In the next order of determination was the power losses due to increased antinodal bending. With three curved transmission lines the degree of bend and its attendant loss was as follows:

| Degree of bend: | Percent of loss |
|---|---|
| 3° | Approximately 27 |
| 15° | Approximately 26 |
| 20° | Approximately 29 |

From this it would indicate that the 15° bend is optimum for a solid transmission line.

Figure 11:
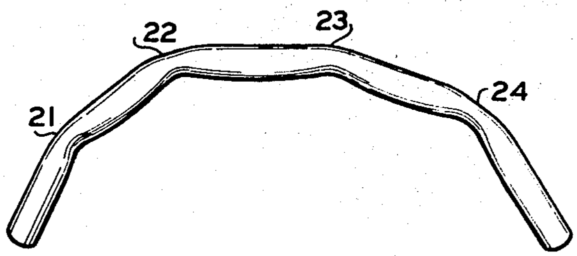
FIG. 11 is another illustration of a curved transmission line with releveled portions at the antinodes.
Figure 12:
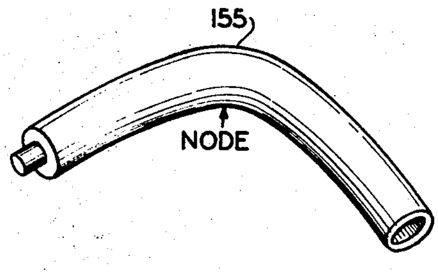
FIG. 12 is another illustration of a curved transmission line having a 90° bend.

Testing was then continued on a contoured transmission line, where the antinodal points were decreased to approximately only half the original diameter as shown in FIG. 11. The sharp 90° bend of the transmission line shown in FIG. 12 did not yield as favorable results as indicated above. Polishing the wall surfaces caused a decrease in the power transmission and the losses increased. No explanation can be given for the above findings.

A reduction in cross section of a multiple wave length of a solid transmission line when located at the antinodes, as shown at 21, 22, 23, and 24 of FIG. 11, served to reduce transmission line losses and increase power capacity as compared to a constant cross section line.

What is claimed is:

1. A motor generator for transforming electrical energy to mechanical energy and back to electrical energy comprising: a first and second resonant piezoelectric electromechanical transducer, a curved transmission line for joining said transducers, said transmission line having a resonant length in half wave equivalents of said transducer, said curvature of said transmission line comprising a series of bends each located at an antinode, means for electrically exciting one of said transducers, and means utilizing the transformation of energy in said other transducer.

2. A motor generator set as set forth in claim 1 wherein said curvature of said transmission line is from 0° to the order of 90°.

3. A motor generator set as set forth in claim 1 wherein the degree of said bends is in the order of 3° to 20°.

4. A motor generator set as set forth in claim 1 wherein said antinode bends further comprise a diameter approximately one-half of the other portions of said line.

5. A motor generator set as set forth in claim 1 wherein the rate of said curvature of said transmission line increases with incerase in line length.

6. An electromechanical generator for converting electrical energy to mechanical enrgy and for transforming said mechanical energy comprising: a resonant piezoelectric transducer, a curved transmission line having a resonant length in halfwave equivalents to that of said transducer, said curvature of said transmission line comprising a series of bends each located at an antinode, means for joining one end of said line to said transducer at its mechanical output end, and wherein said other of said line is free-free.

7. An electromechanical transducer as set forth in claim 6 wherein said curvature of said transmission line is in the order of 0° to 90°.

8. A motor generator set as set forth in claim 6 wherein the degree of said bends is in the order of 3° to 20°.

9. An electromechanical transducer as set forth in claim 6 wherein said antinode bends further comprise a diameter approximately one-half of the other portions of said line.

10. An electromechanical generator set as set forth in claim 6 wherein the rate of said curvature of said transmission line increases with incerase in line length.

References Cited

UNITED STATES PATENTS

| | | | |
|---|---|---|---|
| 1,799,634 | 4/1931 | Norton | 310—8.7 |
| 2,503,831 | 4/1950 | Mason | 310—8.2X |
| 2,514,080 | 7/1950 | Mason | 310—8.2X |
| 3,173,034 | 3/1965 | Dickey et al. | 310—8.3 |
| 3,176,788 | 4/1965 | Harris | 333—30X |
| 3,273,146 | 9/1966 | Hurwitz | 333—30X |
| 3,350,582 | 10/1967 | Attwood et al. | 310—8.1 |

WARREN E. RAY, Primary Examiner

M. O. BUDD, Assistant Examiner

U.S. Cl. X.R.

310—8.3; 333—30